United States Patent

Ayyildiz et al.

Patent Number: 6,019,356
Date of Patent: Feb. 1, 2000

[54] IMPACT ABSORBER

[75] Inventors: Metin Ayyildiz, Köln; Holger Kirchner, Ruppichteroth; Jörg Schmitz, Hennef, all of Germany

[73] Assignee: Mannesmann Boge GmbH, Bonn, Germany

[21] Appl. No.: 09/112,308

[22] Filed: Jul. 9, 1998

[30] Foreign Application Priority Data

Jul. 9, 1997 [DE] Germany .......................... 197 29 288

[51] Int. Cl.⁷ .................. B60R 19/02; F16F 9/16
[52] U.S. Cl. .................. 267/139; 188/276; 188/371; 267/64.15; 267/116
[58] Field of Search .......... 188/269, 371–377, 188/277, 297, 276, 289, 322.19, 300; 267/64.15, 64.26, 116, 139, 140, 120, 64.22, 64.18, 64.12; 293/133, 134, 132, 136; 213/223

[56] References Cited

U.S. PATENT DOCUMENTS

| | | | |
|---|---|---|---|
| 3,237,726 | 3/1966 | Deyerling | 267/126 |
| 4,437,548 | 3/1984 | Ashiba | 293/134 |
| 4,785,921 | 11/1988 | Hosan et al. | 188/300 |
| 4,789,192 | 12/1988 | Warner et al. | 293/134 |
| 4,856,762 | 8/1989 | Selzer | 188/269 |
| 4,901,594 | 2/1990 | Selzer . | |
| 4,988,081 | 1/1991 | Dohrmann | 293/133 |
| 5,485,987 | 1/1996 | Jobelius et al. . | |
| 5,735,371 | 4/1998 | Jobelius et al. | 188/276 |
| 5,862,893 | 1/1999 | Völpel | 188/276 |
| 5,884,959 | 3/1999 | Hillen | 293/134 |

*Primary Examiner*—Douglas C. Butler
*Attorney, Agent, or Firm*—Cohen, Pontani, Lieberman & Pavane

[57] ABSTRACT

An impact absorber for decelerating a vehicle impacting on an obstacle, which impact absorber includes two tubes which can be displaced one inside the other in the manner of a telescope. The inner tube is closed off from the outside by a base and has a highly pressurized gas space and a first fluid space. A second fluid space is arranged in the outer tube and is hydraulically connected to the first fluid space via a restriction formed by a restricting aperture in an intermediate wall fixed in the inner tube. The outer tube has, in the end region, a plastic disk which melts at a predetermined temperature and as a result counteracts an explosion of the impact absorber in the event of a fire by reducing the pressure.

8 Claims, 1 Drawing Sheet

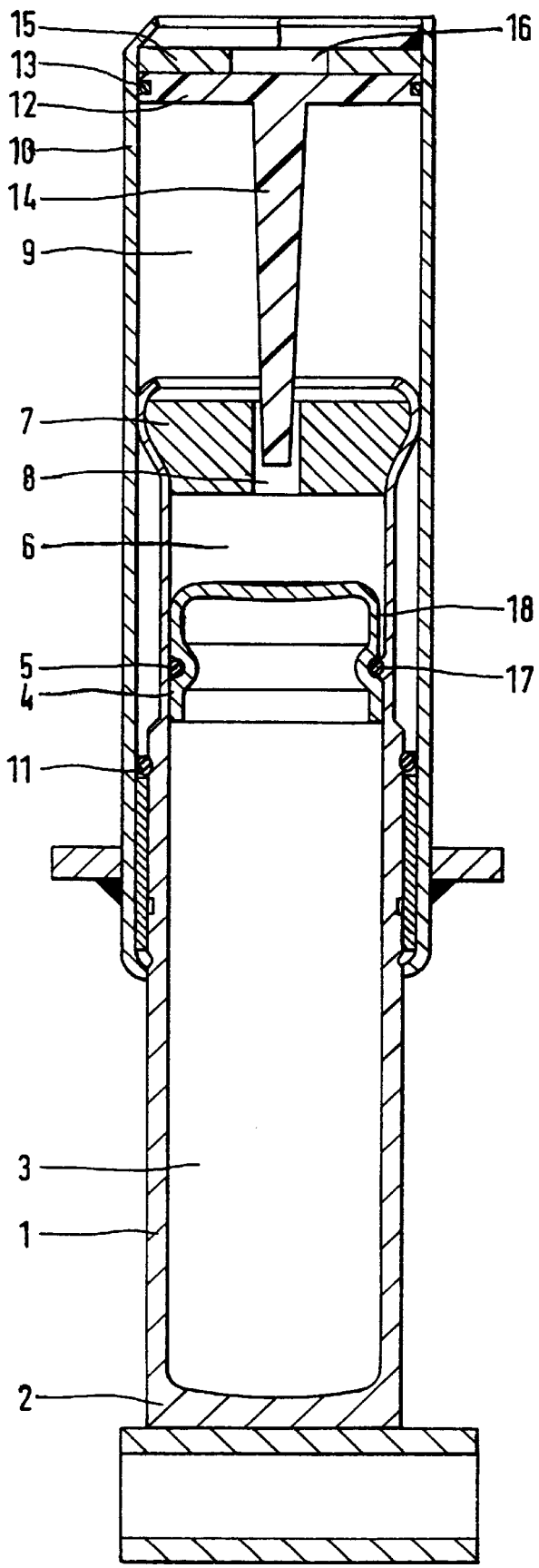

6,019,356

IMPACT ABSORBER

BACKGROUND OF THE INVENTION

1. Field of the Invention

The invention relates to an impact absorber for decelerating a vehicle impacting on an obstacle. Such an impact absorber includes two tubes which can be displaced one inside the other in the manner of a telescope. The inner tube is closed off from the outside by a base and has a highly pressurized gas space and a first fluid space. A second fluid space is arranged in the outer tube and is hydraulically connected to the first fluid space via a restriction formed by a restricting aperture in an intermediate wall fixed in the inner tube.

2. Discussion of the Prior Art

Impact absorbers of this type are disclosed, for example, in German reference DE 34 19 165 C2 and German reference DE 38 22 322 C2. In these constructions two tubes which can be displaced one inside the other are used. The tubes include an inner tube, which is closed off from the outside, and has a gas space which is filled with a highly pressurized gas. A first fluid space is likewise located in the inner tube and is separated from the gas space by a separating piston. A restricting disk, which is fixed in the inner tube, is provided with a restricting aperture and hydraulically connects the first fluid space to a second fluid space. When a vehicle collides with an obstacle at a speed of up to 8 km/h, the impact energy is absorbed by the impact absorber with the inner tube plunging into the outer tube. Here, the damping fluid located in the second fluid space is pushed into the first fluid space by means of the restriction, with the result that the separating piston causes the gas cushion in the gas space to be compressed. The increase in volume in the first fluid space takes place counter to the force of the gas space, thereby forming a gas spring. This gas spring also causes the impact absorber to be returned into the initial position. In the event of a high impact speed, an impact absorber of this type, which is usually fixed on stiff support parts of a vehicle, acts virtually as a rigid structure due to the damping force which acts as a function of the speed. So that the deformation zone of a vehicle is effective in this case, a predetermined breaking point is provided on the impact absorber.

SUMMARY OF THE INVENTION

Accordingly, it is an object of the present invention to provide an impact absorber that does not explode in the event of a vehicle fire, and furthermore has increased energy-absorption efficiency. It is a further object to provide an impact absorber that permits cost-effective production.

Pursuant to this object, and others which will become apparent hereafter, one aspect of the present invention resides in providing the outer tube, in the outer, end region, with a plastic disk which melts at a predetermined temperature and is sealed off from the inner wall of the outer tube, preferably by means of a sealing ring. A plastic disk of this type is a component which can be produced and fitted in a simple manner. It is also possible for the seal to be designed as a lip seal, for example, and to be integrally produced together with the plastic disk.

In a further embodiment of the invention, the restricting aperture interacts with a control pin which is preferably conical and is arranged in the outer tube. The control pin is fixedly connected to the plastic disk. A cost-effective design is obtained by the control pin being made of plastic and being of integral design with the plastic disk. This plastic component can be produced inexpensively and with relatively close tolerances by injection molding. It is also possible to obtain increased energy-absorption efficiency with such a construction. The combined plastic part thus firstly seals off the second fluid space from the outside in the event of a fire, secondly provides a precisely produced control pin, and thirdly provides an antibursting element which melts in the event of a fire and opens the inner space of the impact absorber to the outside.

According to another embodiment of the invention, a sealing ring is arranged in an annular groove in the separating piston, which is arranged between the gas space and the first fluid space. The sealing ring is made of plastic and melts at a predetermined temperature so that the pressure in the gas space is reduced in the event of a fire. It is advantageous if the separating piston is provided with at least one groove which runs axially and, if desired, radially and which opens, on the one hand, into the annular groove and, on the other hand, into the restricting aperture.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The single figure is a cross-section through an impact absorber pursuant to the present invention.

DETAILED DESCRIPTION OF THE PREFERRED EMBODIMENTS

The figure shows an impact absorber in longitudinal section, in which an inner tube 1 is closed to the outside by a base 2. The inner tube 1 has a gas space 3 arranged in it which is filled with a highly pressurized gas and is separated off from a first fluid space 6 by an axially movable separating piston 4. The separating piston 4 is sealed off from the inner wall of the inner tube 1 by a sealing ring 5. The first fluid space 6, which is filled with damping fluid, is bounded in the axial direction by the separating piston 4 on the one hand and by an intermediate wall 7 connected to the inner tube 1 on the other hand. The intermediate wall 7 has a restricting aperture 8.

The inner tube 1 is guided in an axially movable manner in an outer tube 10 and is sealed off from the outside by a sealing ring 11. A metal disk 15 is fixed on the end of the outer tube 10. The metal disk 15 is provided with an aperture 16. A plastic disk 12, which is sealed off from the inner wall of the outer tube 10 by a sealing ring 13, seals off a second fluid space 9 from the outside. This second fluid space 9, which is located in the outer tube 10, is hydraulically connected to the first fluid space 6 via the restricting aperture 8. A conical control pin 14, which is connected to the plastic disk 12, is provided to change the cross-section of the restricting aperture 8. This control pin 14 is preferably made of plastic and is integral with the plastic disk 12. This component (the pin 14 and the disk 12) can be produced very precisely within close tolerances and inexpensively by injection molding, as a result of which high energy-absorption efficiency is made possible.

When the vehicle collides with an obstacle, the inner tube 1 is pushed into the outer tube 10, thereby causing damping fluid to be pushed out of the second fluid space 9 into the first fluid space 6 via the restriction cross section formed by the restricting aperture 8 and the control pin 14. The increase in volume in the first fluid space 6 causes the separating piston 4 to be displaced counter to the spring force of the gas space 3 and causes this gas spring to be further pretensioned. The impact absorber is subsequently pressed back into the starting position by means of the spring force of the gas spring.

In order, in the event of a fire, to avoid an explosion of the impact absorber essentially due to an increase in pressure in the inner space, provision is made for the plastic disk 12 to melt at a predetermined temperature. This is achieved by selecting a plastic suitable for this purpose. When the plastic disk 12 melts, the aperture 16 in the metal disk 15 and also the restricting aperture 8 are released and the damping fluid can be pressed outward. Since the control pin 14 also emerges from the restricting aperture 8 when the plastic disk 12 melts, a very rapid reduction in the internal pressure is ensured. This is further assisted if the sealing ring 5 of the separating piston 4, which sealing ring 5 is arranged in an annular groove 17 in the separating piston 4, is likewise produced from such a plastic and melts. In this case, the pressurized gas can also escape from the gas space 3, it being advantageous for this purpose if the separating piston 4 is provided with at least one groove 18 which opens into the annular groove 17 and when the separating piston 4 bears against the intermediate wall 7, produces the flow connection to the restricting aperture 8.

The invention is not limited by the embodiments described above which are presented as examples only but can be modified in various ways within the scope of protection defined by the appended patent claims.

We claim:

1. An impact absorber for decelerating a vehicle impacting on an obstacle, comprising:

an outer tube;

an inner tube arranged in the outer tube so that the inner tube and the outer tube are displaceable relative to one another, the inner tube having a base so as to be externally closed off and defining a highly pressurized gas space and a first fluid space, the outer tube defining a second fluid space;

an intermediate wall fixed in the inner tube and having a restricting aperture that hydraulically connects the second fluid space to the first fluid space;

a plastic disk arranged in an end region of the outer tube, the plastic disk being meltable at a predetermined temperature;

sealing means for sealing the plastic disk from an inner wall of the outer tube; and a control pin fixed to the plastic disk so as to be arranged in the outer tube and interact with the restricting aperture.

2. An impact absorber as defined in claim 1, wherein the sealing means is a sealing ring.

3. An impact absorber as defined in claim 1, and further comprising a metal disk fixed to the outer tube and having at least one aperture therein, the plastic disk being arranged in the outer tube so as to be pressed against the metal disk by internal pressure in the second fluid space.

4. An impact absorber as defined in claim 1, wherein the control pin is conical.

5. An impact absorber as defined in claim 1, wherein the control pin is made of plastic and is integral with the plastic disk.

6. An impact absorber as defined in claim 1, and further comprising a separating piston arranged in the inner tube between the gas space and the first fluid space, the separating piston having an annular groove, a plastic sealing ring which melts at a predetermined temperature being arranged in the annular groove.

7. An impact absorber as defined in claim 6, wherein the separating piston has at least one groove that runs axially and opens into the annular groove and the first fluid space.

8. An impact absorber as defined in claim 7 wherein the groove in the separating piston is configured to run axially and radially.

* * * * *